Figure 1:
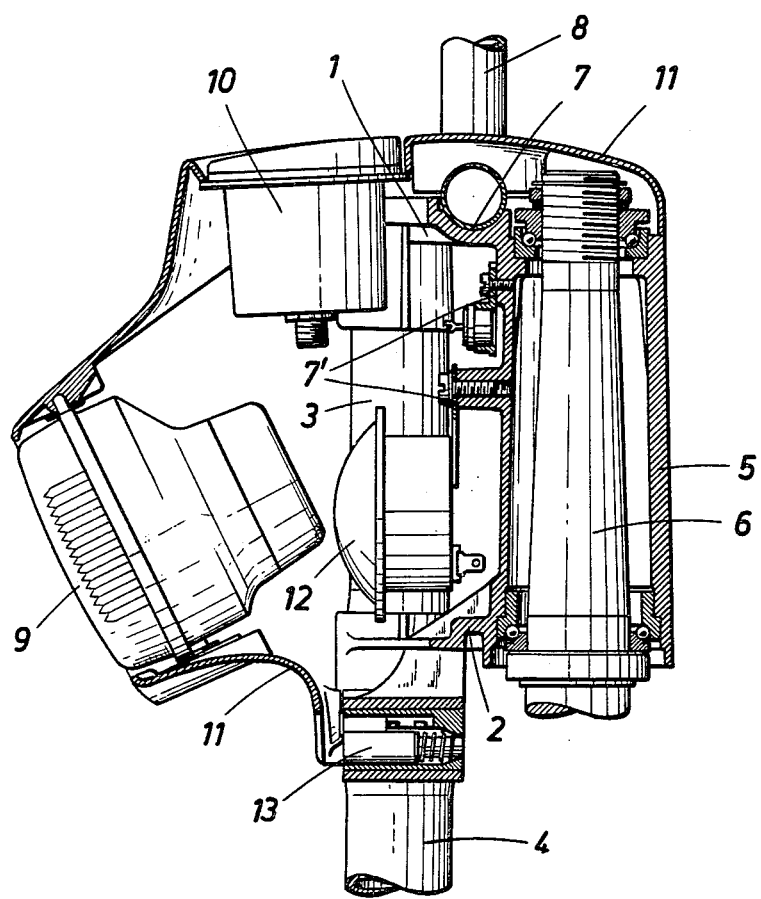

United States Patent [19]

Resele et al.

[11] 4,373,741
[45] Feb. 15, 1983

[54] FRONT FORK AND FORK HEAD FOR MOTORCYCLES

[75] Inventors: Peter Resele; Manfred Haslinger, both of Graz, Austria

[73] Assignee: Steyr-Daimler-Puch Aktiengesellschaft, Vienna, Austria

[21] Appl. No.: 144,416

[22] Filed: Apr. 28, 1980

[30] Foreign Application Priority Data

May 16, 1979 [AT] Austria .................. 3613/79

[51] Int. Cl.³ .............................................. B62K 21/02
[52] U.S. Cl. ..................................... 280/279; 280/280
[58] Field of Search ................... 280/281 R, 279, 280, 280/277, 276, 269; 180/219

[56] References Cited

U.S. PATENT DOCUMENTS

| 623,507 | 4/1899 | Barnish | 280/280 |
| 4,201,397 | 5/1980 | Matthias | 280/280 |

FOREIGN PATENT DOCUMENTS

| 701859 | 12/1940 | Fed. Rep. of Germany | 280/277 |
| 822342 | 11/1951 | Fed. Rep. of Germany | |
| 1011760 | 12/1957 | Fed. Rep. of Germany | |
| K17446 | 12/1975 | Fed. Rep. of Germany | |
| 1084795 | 7/1954 | France | |
| 531596 | 8/1955 | Italy | 280/279 |
| 463983 | 11/1968 | Switzerland | |
| 1895 Ad.10175 | of 1896 | United Kingdom | 280/279 |
| 209921 | 1/1924 | United Kingdom | 280/279 |

Primary Examiner—John A. Pekar
Attorney, Agent, or Firm—Kurt Kelman

[57] ABSTRACT

A fork head for a motorcycle comprises an integral, pressure diecast body formed with two sockets for receiving respective fork blades, an upper and a lower cross-piece interconnecting the sockets, a centrally arranged bearing sleeve for receiving an upstanding pin carried by the frame of the motorcycle, lateral walls extending obliquely between the bearing sleeve and the sockets, and at least one bearing surface for conforming engagement by at least one accessory including a trim covering a front portion of the fork head above the bearing sleeve and the sockets.

1 Claim, 5 Drawing Figures

FRONT FORK AND FORK HEAD FOR MOTORCYCLES

This invention relates to a fork head for motorcycles, comprising two sockets for receiving respective fork blades and upper and lower cross-pieces connecting the sockets.

Fork heads of that kind have been assembled by screwing together the crosspieces and the sockets consisting in most cases of pressed sheet metal elements and, in some cases, they can be pivoted to the frame of a motorcycle by a pivot pin which extends through a bearing sleeve fixed to the frame of the motorcycle. The fact that these fork heads consist of a plurality of parts adds to their manufacturing costs and requires small tolerances to be adhered to for the assembling. Nevertheless, parts of the fork head may become loose during the operation of the motorcycle so that the front wheel can no longer be accurately steered because the fork head does not ensure an exactly parallel position of the two fork blades. As a result, the handling properties of the motorcycle are adversely affected as the fork head lacks the required rigidity, particularly under high stress.

Other fork heads have been disclosed in British Patent Specification No. 209,021 and comprise a bearing sleeve which receives a pivot pin that is secured between two frame tubes are arranged one over the other. The bearing sleeve is provided with links which are pivoted to and serve to control the front fork, and brackets for fixation to the steering column. Such a fork head has a very low stability because the front fork is guided by links, and renders the mounting of a headlight, of instruments, trim and the like very difficult.

It is an object of the invention to eliminate these disadvantages and to provide a fork head which can be made easily and at low cost and ensures an exact steering of the front wheel and can be made in a pleasing shape.

This object is accomplished according to the invention with an integral, diecast fork head formed with bearing surfaces for conforming engagement by accessories, such as the handlebar, the headlight fittings, trim, and a steering column lock.

Because the fork head is integral, it has no parts which can move relative to each other. As a result, the fork blades will always remain exactly in the correct position. The fork head is made in a particularly simple manner and at low cost by pressure diecasting and the bearing surfaces for conforming engagement by attached parts can be formed in the same operation as the sockets and cross-pieces and without need for a subsequent machining. The fork head may be covered by trim which is pleasing in appearance and protects the fork head from being soiled and which may be used as an additional support for various instruments. Besides, the fork head may be provided with stops which limit the steering angle.

The fork head further comprises a bearing sleeve in which an upstanding pin secured to the frame of the motorcycle is rotatably mounted in known manner so that the fork head can be pivotally moved around said pin to steer the vehicle.

According to a further feature of the invention, the fork head is formed adjacent to its lower crosspiece with bearing shell sections which conform to the fork blades but extend only around part of the periphery of the associated fork blade. Clamping elements conform to the fork blade and are adapted to be forced against the same by tangentially extending clamp screws. In this way, the fork blades can easily be fixed so as to be free from backlash and dangerous bending stresses in the pressure diecasting in the regions in which the fork blades are clamped will be avoided.

Figure 2:
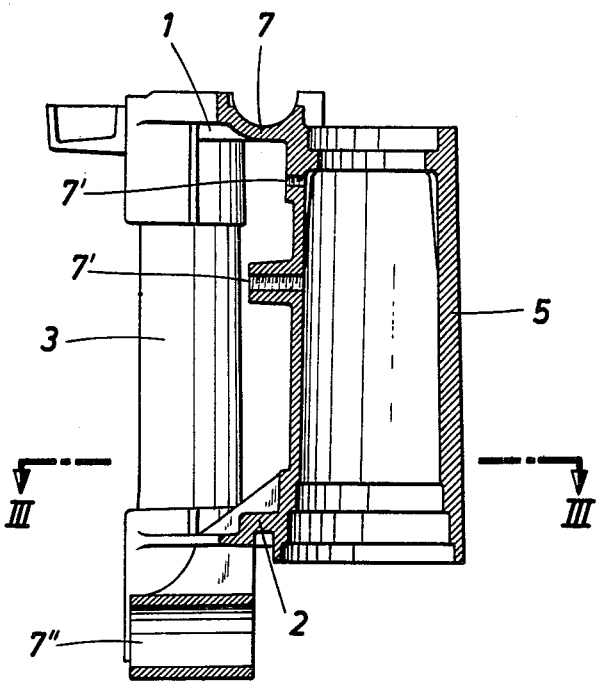
Figure 3:
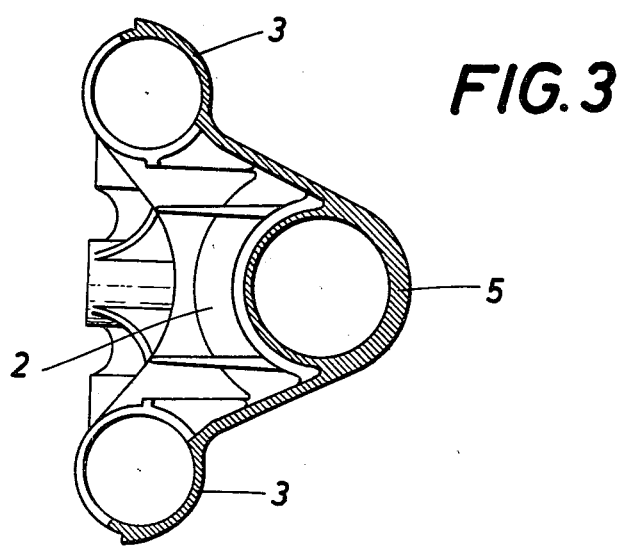
Figure 4:
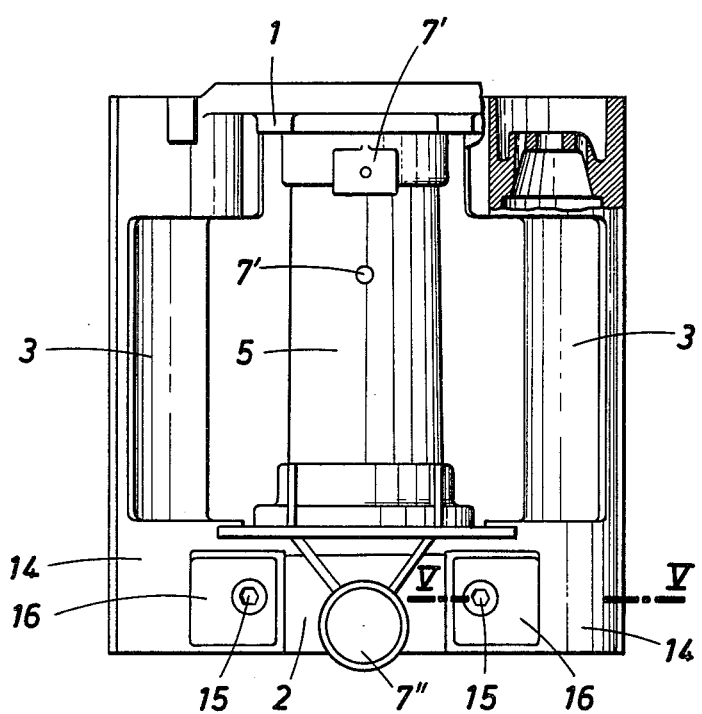
Figure 5:
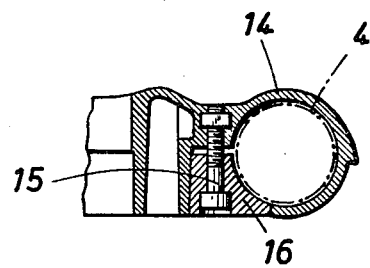

An embodiment of the invention is shown by way of example on the accompanying drawing, in which FIG. 1 is a vertical central sectional view showing a fork head and all parts associated with it, FIG. 2 is a similar view showing the fork head alone, FIG. 3 is a horizontal sectional view taken on line III—III in FIG. 2, FIG. 4 is a front elevation showing the fork head, partly in section and FIG. 5 is an enlarged sectional view taken on line V—V of FIG. 4 and showing a detail.

The fork head comprises a one-piece body which consists of a pressure diecasting and is formed with two sockets 3 which serve to receive respective fork blades 4, an upper crosspiece 1 and a lower crosspiece 2 connecting said sockets. The pressure diecasting is also formed with a bearing sleeve 5 for receiving an upstanding pivot pin secured to the frame of the motorcycle so that the entire fork head is pivotally movable about that upstanding pivot pin 6. The pressure diecasting is also formed with bearing surface 7 for conforming engagement by a handlebar 8, tapped bearings 7' receiving fastening screws for attachment of an instrument and horn 12, and bearing sleeve 7" carrying a steering column lock 13. As shown in FIG. 1, trim 11 covers a front portion of the fork head above sockets 3 and bearing sleeve 5, headlight 9 and an instrument being held in the front portion of trim 11. Adjacent to the lower crosspiece 2, the fork head forms shell sections 14 (FIG. 5) which conform to the fork blades 4 but extend only around part of the periphery of the respective blade. A clamping member 16 is secured to each of the shell sections 14 by tangentially extending clamp screws 15 and is adapted to be forced against associated the fork blade 4 in conforming engagement therewith by clamp screws 15.

What is claimed is:

1. In a fork for motorcycles, comprising two fork blades; a fork head comprising a body integrally formed with two sockets, an upper and lower cross-piece connecting said sprockets, two laterally open shell sections adjacent the lower cross-piece, the shell sections being aligned with respective ones of said sockets and being in conforming engagement with part of the periphery of respective ones of said fork blades, each of said fork blades fitting in one of said sockets; a clamp member secured to each of said shell sections and in conforming engagement with another part of the periphery of respective ones of said fork blades; and tangentially extending screws securing each clamp member to a respective one of said shell sections and tightened to force the clamp members against the fork blades.

* * * * *